(12) United States Patent
Haines et al.

(10) Patent No.: US 6,985,241 B1
(45) Date of Patent: Jan. 10, 2006

(54) IMAGE FORMING DEVICE, AN IMAGE FORMING SYSTEM, AND A METHOD OF FACILITATING ORDERING OF AN IMAGING CONSUMABLE

(75) Inventors: Robert E. Haines, Boise, ID (US); Mark A. Harper, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

(21) Appl. No.: 09/710,404

(22) Filed: Nov. 10, 2000

(51) Int. Cl.
*G06F 15/00* (2006.01)

(52) U.S. Cl. .................. 358/1.14; 358/1.15; 399/9; 399/24

(58) Field of Classification Search ............... 399/9, 399/10, 11, 12, 24; 358/1.13, 1.14, 1.15
See application file for complete search history.

(56) References Cited

U.S. PATENT DOCUMENTS

| | | | |
|---|---|---|---|
| 4,167,322 A * | 9/1979 | Yano et al. ............... 700/19 |
| 5,862,404 A | 1/1999 | Onaga | |
| 6,023,593 A * | 2/2000 | Tomidokoro ............... 399/8 |
| 6,108,099 A * | 8/2000 | Ohtani ............... 358/1.15 |
| 6,494,552 B1 | 12/2002 | Miyamoto et al. | |
| 2001/0004734 A1 | 6/2001 | Kudoh et al. | |
| 2002/0008883 A1 | 1/2002 | Shibata | |

FOREIGN PATENT DOCUMENTS

| | | |
|---|---|---|
| CN | 1206154 A | 1/1999 |
| EP | 1193196 A1 | 4/2002 |
| EP | 1197842 A2 | 4/2002 |
| FR | 2797068 A | 2/2001 |
| JP | 11352846 A | 12/1999 |
| JP | 2001117448 | 4/2001 |

OTHER PUBLICATIONS

U.S. Appl. No. 09/480,536; filed Jan. 10, 2000; Robert E. Haines et al.; entitled "Printing Device Replaceable Components with Automatic Order Functionality;".
U.S. Appl. No. 09/665,349; filed Sep. 18, 2000; Mark A. Harper et al.; entitled "Localizing Client Purchasing of Consumables for HardcopyOutput Engine and Method;".
U.S. Appl. No. 09/710,367; filed Nov. 10, 2000; Robert E. Haines et al.; "An Apparatus, an Article of Manufacture, and a Method of Reconfiguring an Image Forming Device;".
Office Action dated Aug. 6, 2004 issued in Chinese Application Serial No. 01125504.8; filed Aug. 9, 2001 related to U.S. Appl. No. 09/710,367, filed Nov. 10, 2000; 9 pp.

* cited by examiner

*Primary Examiner*—Thomas D. Lee

(57) ABSTRACT

An image forming device, an image forming system, and a method of facilitating ordering of an imaging consumable are provided. In one aspect, an image forming device includes storage circuitry configured to store an initial variable configured to control the formulation of an initial one of a plurality of consumable order assist functions configured to assist replenishment of an imaging consumable; imaging circuitry configured to consume the imaging consumable to form hard images; a sensor configured to monitor a status of the imaging consumable and to output a signal indicative of the status; processing circuitry configured to replace the initial variable with another variable configured to control the formulation of another of the consumable order assist functions, to receive the signal from the sensor, and to formulate the another consumable order assist function responsive to reception of the signal and the another variable; and an interface configured to communicate the another consumable order assist function externally of the image forming device.

24 Claims, 2 Drawing Sheets

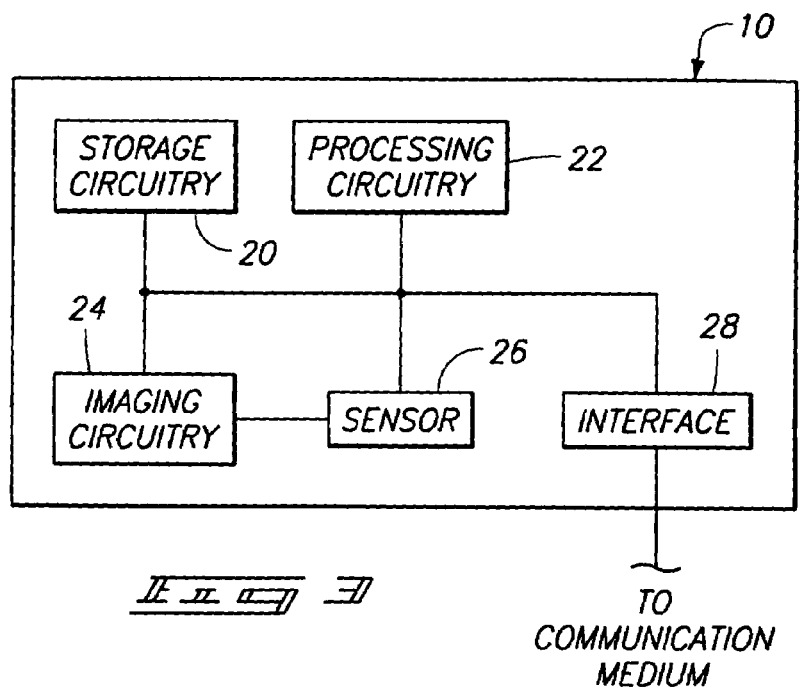
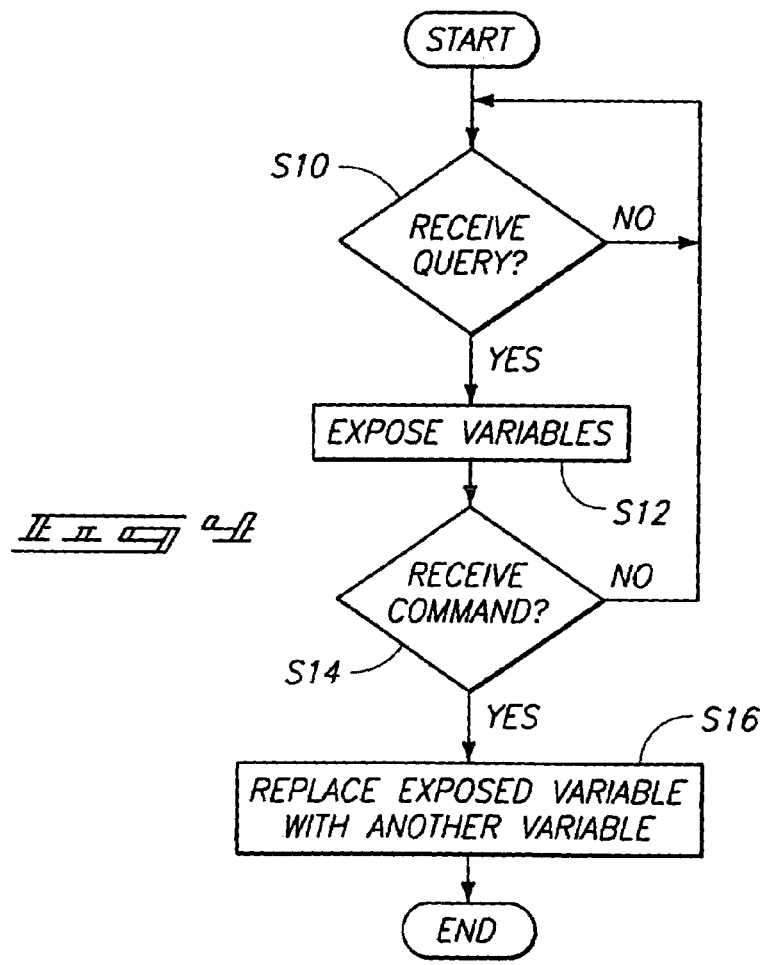

IMAGE FORMING DEVICE, AN IMAGE FORMING SYSTEM, AND A METHOD OF FACILITATING ORDERING OF AN IMAGING CONSUMABLE

FIELD OF THE INVENTION

This invention pertains to an image forming device, an image forming system, and a method of facilitating ordering of an imaging consumable.

BACKGROUND OF THE INVENTION

Systems and methods relating to document generation have experienced great advancements in both host device configurations, such as personal computers, as well as imaging devices, such as printers. Personal computers operate at faster processing rates with increased storage capacities while imaging devices provide tremendous resolution, color capabilities, and enhanced imaging speeds, for example.

Imaging systems arranged to generate hard images are ubiquitous in the workplace. Network systems are often coupled with numerous imaging devices, for example, which provide imaging capabilities at various locations within a work environment. Imaging devices configured to generate hard images use consumables during operation. Exemplary consumables include developing material (e.g., toner), media, developing assemblies, fusing assemblies, etc. Expiration of a consumable ceases operation of the corresponding imaging device until replacement of the same.

In some imaging system arrangements, such as network based arrangements comprising numerous imaging devices, a person is assigned with monitoring consumable usage, reordering consumables, etc. to maintain operability of the imaging devices. Such entails the individual manually verifying the amount of consumables remaining within inventory, monitoring status of consumables of the respective devices and replenishment of the consumables in inventory and within individual imaging devices when necessary. In systems having perhaps hundreds of imaging devices, the task of monitoring, replacing and maintaining consumables for such imaging devices is increasingly time consuming and subject to misordering of consumables and other errors.

There exists a need to provide improved imaging devices and methodologies which assist with management of imaging consumables.

SUMMARY OF THE INVENTION

The invention provides an image forming device, an image forming system, and a method of facilitating ordering of an imaging consumable.

One aspect of the invention provides an image forming device comprising: storage circuitry configured to store an initial variable configured to control the formulation of an initial one of a plurality of consumable order assist functions configured to assist replenishment of an imaging consumable; imaging circuitry configured to consume the imaging consumable to form hard images; a sensor configured to monitor a status of the imaging consumable and to output a signal indicative of the status; processing circuitry configured to replace the initial variable with another variable configured to control the formulation of another of the consumable order assist functions, to receive the signal from the sensor, and to formulate the another consumable order assist function responsive to reception of the signal and the another variable; and an interface configured to communicate the another consumable order assist function externally of the image forming device.

Another aspect provides an image forming system comprising: an image forming device configured to consume an imaging consumable to form hard images, to monitor a status of the imaging consumable, and to store an initial variable configured to control the formulation of an initial one of a plurality of consumable order assist functions configured to assist replenishment of the imaging consumable; and a host device coupled with the image forming device and configured to provide another variable to the image forming device to control the formulation of another one of the consumable order assist functions, wherein the image forming device is configured to replace the initial variable with the another variable to control the formulation of the another consumable order assist function responsive to the detection of a predetermined status of the imaging consumable.

Yet another aspect of the invention includes a method of facilitating ordering of an imaging consumable useable within an image forming device comprising: providing an image forming device configured to use an imaging consumable to form hard images; providing an initial variable within the image forming device to control the formulation of an initial one of a plurality of consumable order assist functions configured to assist replenishment of the imaging consumable; replacing the initial variable with another variable within the image forming device to control the formulation of another of the consumable order assist functions; detecting an amount of the imaging consumable being at a predetermined status; and generating the another one of the consumable order assist functions responsive to the detecting and the replacing.

Other features and advantages of the invention will become apparent to those of ordinary skill in the art upon review of the following detailed description, claims, and drawings.

DESCRIPTION OF THE DRAWINGS

FIG. 3 is a functional block diagram of an exemplary image forming device.

FIG. 4 is a flow chart depicting an exemplary methodology executable within the image forming device.

DETAILED DESCRIPTION OF PREFERRED EMBODIMENTS

Figure 1:
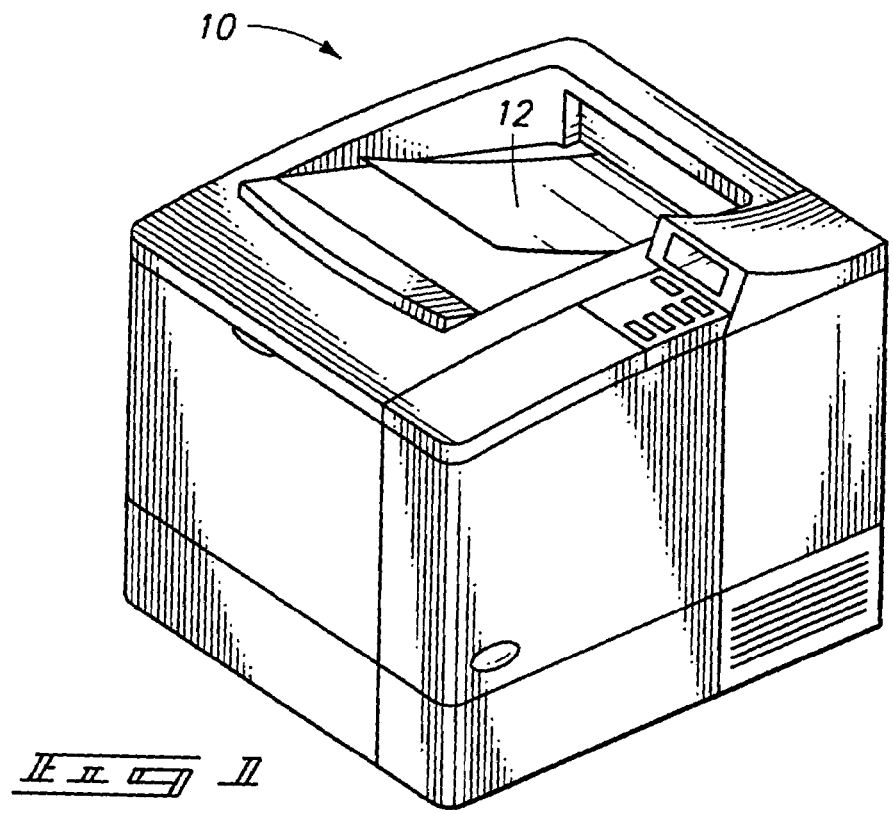
FIG. 1 is an isometric view of an exemplary image forming device embodying aspects of the present invention.

FIG. 1 depicts an exemplary image forming device 10. Image forming device 10 is configured to form hard images upon media 12 in the described embodiment. One exemplary image forming device 10 comprises a printer, such as a laser printer, ink jet printer, a dot matrix printer, or a dry medium printer. The present invention is embodied within other image forming device configurations such as multiple function peripheral devices, copiers, facsimile machines, plotters, etc. or other arrangements configured to form hard images upon media 12 according to alternative embodiments of the invention. Device 10 is arranged to form hard images upon media 12 including, for example, paper, envelopes, transparencies, labels, etc.

Figure 2:
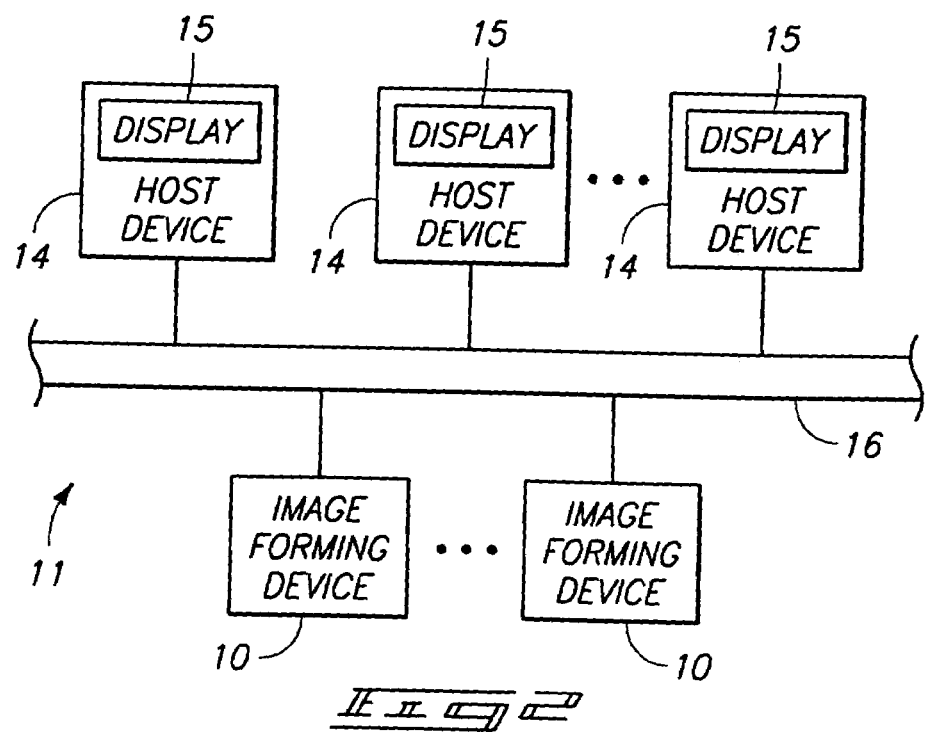
FIG. 2 is an illustrative representation of an exemplary image forming system embodying aspects of the present invention.

Referring to FIG. 2, an image forming system 11 is depicted comprising plural image forming devices 10, plural host devices 14 and a communication medium 16. Communication medium 16 provides connectivity intermediate image forming devices 10 and host devices 14 to implement communications therebetween. An exemplary communication medium 16 includes packet switched networks such as an Intranet network (e.g., Ethernet arrangement), Internet and/or other communication configurations operable to provide electronic exchange of information between image forming devices 10 and host devices 14, using an appropriate protocol, such as TCP/IP. Some of depicted devices 10, 14 of system 11 may be coupled with an Intranet portion of medium 16 while other devices 10, 14 are coupled with an Internet portion of medium 16. Other image forming systems 11 of the invention include more or less devices 10, 14 depending upon a given configuration.

In general, host devices 14 execute applications wherein formation of hard images upon media is desired. For example, host devices 14 comprise personal computers (PCs) in exemplary configurations configured to execute an appropriate word processor, spread sheet, or other application for generating documents having images thereon. Host devices 14 individually include a display 15, such as a CRT or flat panel monitor, to display information to a user. Individual host devices 14 communicate image data via communication medium 16 to an appropriate image forming device 10. Alternatively, image data to be printed or otherwise imaged using imaging devices 10 is supplied from other external devices (not shown) coupled with, for example, communication medium 16.

In addition to generation and/or communication of image data with respect to image forming devices 10, host devices 14 also communicate with individual image forming devices 10 to learn information regarding the respective image forming devices 10. In one exemplary configuration, host devices 14 are arranged to execute a remote query language to obtain information (e.g., device configuration, status, etc.) from image forming devices 10.

One exemplary remote query language implemented within image forming system 11 is a Simple Network Management Protocol (SNMP). In such an exemplary configuration, host devices 14 include respective processing circuitry (not shown) operable to formulate an appropriate SNMP query or request which is addressed to one or more appropriate image forming device 10 using communication medium 16. The appropriate image forming device(s) 10 receive the query or request and provide information back to appropriate host devices 14 using communication medium 16. Protocols other than SNMP are utilized in other embodiments to implement communications within system 11.

The remote query language is utilized in the exemplary configuration to expose objects (also referred to as variables) within individual image forming devices 10. For example, host devices 14 generate a "get" command to obtain values of variables set within the appropriate image forming device 10. In the exemplary SNMP configuration, a management information base (MIB) is utilized to obtain information from individual image forming devices 10. Responsive to a "get" command, image forming devices 10 communicate available variables and the status or setting of respective variables to host devices 14. Thereafter, an individual host device 14 communicates a "set" command via communication medium 16 to alter or change a given variable or object within a respective image forming device 10.

In an exemplary configuration, image forming devices 10 utilize a Printer Management Language (PML) protocol. PML is a protocol which permits many applications to exchange device management information with numerous image forming devices 10. PML is an object-oriented request-reply protocol which supports asynchronous printer query, control, and monitor capabilities. As described further below, individual image forming devices 10 implement any conversion operations between the protocol used to exchange information with respect to image forming devices 10 (e.g., SNMP) and the internal protocol (e.g., PML) used within the respective image forming devices 10.

Referring to FIG. 3, exemplary components of a single image forming device 10 are shown. As illustrated, the depicted image forming device 10 includes storage circuitry 20, processing circuitry 22, imaging circuitry 24, a sensor 26 and an interface 28 individually coupled with a communication medium 30. Communication medium 30 is configured as an internal bus to implement communication functionality intermediate components of image forming device 10. Other configurations of image forming device 10 are provided in alternative arrangements (not shown).

Storage circuitry 20 is configured to store variables for controlling various operations of image forming device 10 and other information or data as described in further detail below. Exemplary storage circuitry 20 comprises non-volatile memory (e.g., EEPROM, flash memory and/or read only memory (ROM)), random access memory (RAM), and hard disk and associated drive circuitry. Storage circuitry 20 is configured to store executable instructions as firmware or software configured to control operation of image forming device 10. Further, storage circuitry 20 stores image data used for the formation of hard images, variables corresponding to settings of image forming device 10, and any other appropriate information to be stored within image forming device 10.

Processing circuitry 22 is implemented as a dedicated microprocessor in the depicted embodiment of image forming device 10. Processing circuitry 22 is configured to execute a plurality of ordered executable instructions implemented as firmware and/or software. The ordered instructions are executed to control image forming operations within image forming device 10, to provide monitoring of components of device 10, to provide monitoring of imaging consumables, and other operations of device 10.

Imaging circuitry 24 is configured to form hard images upon media responsive to image data. In the described printer embodiment, imaging circuitry 24 includes print circuitry arranged to print images upon media 12, such as paper, transparencies, labels, etc. In the exemplary described embodiment, imaging circuitry 24 includes circuitry to control paper path components (not shown) to implement movement of media 12 within image forming device 10, developing components (not shown) configured to provide a developing material, such as toner, upon media 12, fusing components (not shown) configured to affix the developing material to media 12 as well as any other components (not shown) to implement other desired processing or imaging operations, such as downstream processing of media (e.g., stapling, collating, etc).

Sensor 26 is provided to monitor at least one operation within imaging circuitry 24 of image forming device 10. A plurality of sensors 26 are provided to monitor more than one operation of image forming device 10 in other configurations.

More specifically, imaging circuitry 24 consumes imaging consumables during the formation of hard images. Exemplary imaging consumables include developing material, media, staples, and components having a fixed life span (e.g., fusing assembly and/or developing assembly). In one aspect of the invention, sensor 26 is configured to monitor an imaging consumable used to form hard images upon media. For example, sensor 26 is arranged to monitor a status of an imaging consumable. Status of an imaging consumable may be represented in a plurality of ways. For example, sensor 26 is arranged in one embodiment to monitor remaining capacities of respective imaging consumables (e.g., amount of toner in weight or volume remaining for usage, amount of fuser life in hours remaining for usage). Alternatively, sensor 26 is configured to monitor usage of the respective imaging consumables. Sensor 26 may be additionally configured to indicate both remaining capacity and usage of respective consumables. The remaining capacity and/or usage information may be indicated in terms of weight, volume, hours, or any other unit capable of indicating usage or remaining capacity of the respective imaging consumables. Sensor 26 is configured to output signals indicative of the statuses (e.g., usage and/or remaining life) of imaging consumables to communication medium 30. Processing circuitry 22 is configured to receive and process the signals from medium 30. Other sensor configurations are provided to monitor other imaging consumable levels or other operations of image forming device 10 in other configurations.

Interface 28 is configured to implement connectivity of image forming device 10 to external components. Interface 28 also implements any desired protocol conversion operations, such as converting requests and replies intermediate appropriate protocols, such as SNMP and PML.

An exemplary interface 28 comprises a network interface card (NIC), such as a JetDirect(™) card available from Hewlett-Packard Company. In the illustrated embodiment, interface 28 is coupled with communication medium 16. Remote query language commands and responses are communicated with respect to image forming device 10 using interface 28. Interface 28 is additionally operable to receive image data from communication medium 16. Thereafter, hard images of such image data are formed utilizing imaging circuitry 24.

According to aspects of the present invention, image forming device 10 is operable to implement various functions regarding usage of imaging consumables during imaging operations, and replenishing of such consumables. In one implementation, image forming device 10 formulates a plurality of consumable order assist functions to assist with replenishment of one or more imaging consumable. Such consumable order assist functions are triggered responsive to monitoring of imaging consumables using sensor 26 in one exemplary configuration.

As previously mentioned, sensor 26 is arranged to monitor a level, or consumed or remaining life of an imaging consumable. Sensor 26 outputs a signal indicative of the level or life of the corresponding imaging consumable. Processing circuitry 22 is operable to formulate one of a plurality of consumable order assist functions responsive to reception of the signal from sensor 26 and corresponding to the setting of a variable, such as a PML object, stored within storage circuitry 20. More specifically, upon indication from sensor 26 of one imaging consumable being at a predetermined level, processing circuitry 22 generates the consumable order assist function corresponding to the variable stored within storage circuitry 20 in the exemplary embodiment. The variable stored within storage circuitry 20 controls the generation of an appropriate one of the consumable order assist functions as well as the forwarding of the consumable order assist function to an appropriate location external of image forming device 10. Exemplary consumable order assist functions are discussed below.

The described image forming device 10 is initially provided with an initial variable within storage circuitry 20 configured to control processing circuitry 22 to formulate an initial one of the plurality of consumable order assist functions. In but one example, the initial variable within storage circuitry 20 operates to control processing circuitry 22 to formulate the initial consumable order assist function comprising an identifier of a supplier of the imaging consumable being monitored, also referred to as a supplier identifier, as well as an identifier of the imaging consumable being monitored, also referred to as a consumable identifier.

An exemplary supplier identifier is a uniform resource locator (URL) address corresponding to a supplier (e.g., www.hp.com) and an exemplary identifier of the imaging consumable being monitored is the model or part number of the consumable. Further details regarding storage of a URL as a PML object are described in U.S. patent application Ser. No. 09/665,349 filed on Sep. 18, 2000, entitled "Localizing Client Purchasing Of Consumables For Hardcopy Output Engine And Method" with Mark A. Harper and Robert E. Haines as inventors, and incorporated herein by reference.

This exemplary initial consumable order assist function is beneficial to a direct connection user wherein a single image forming device 10 is coupled directly with a single host device 14, for example, within a home environment. Following formulation of the appropriate consumable order assist function using processing circuitry 22, the initial variable causes processing circuitry 22 to output the consumable order assist function to interface 28 for external communication from image forming device 10. In the exemplary arrangement, host device 14 receives the consumable order assist function comprising the identifier of a supplier and the identifier of the imaging consumable. Thereafter, connection with the Web site or other location corresponding to the provided identifier within the consumable order assist function is automatically or manually implemented depending upon the desired configuration. Such facilitates reordering of the imaging consumable being at the predetermined level.

At a subsequent moment in time (e.g., following shipment of image forming device 10 from the factory), it may be desired to implement another consumable order assist function corresponding to the respective application of the given image forming device 10. For example, image forming device 10 may be provided in a network application wherein numerous host devices 14 and numerous image forming devices 10 are provided (as shown in FIG. 2). In such a situation, it may be desirable to provide another consumable order assist function more tailored to the particular application of image forming device 10 than the initial or current consumable order assist function.

For example, another consumable management assist function can provide a supplier identifier comprising an email address of a host device 14 associated with a person or entity responsible for management of consumables (e.g., supplier, purchaser, server, etc.). Other consumable management assist functions may be provided by image forming device 10.

In addition, external devices, such as host devices 14, may access the variable to determine the appropriate consumable order assist function to be performed thereby with respect to the image forming device 10. For example, a host device 14 accessing the variable may depict a Web page depicting an order button to couple the host device 14 with a predetermined Web site (using a URL corresponding to the variable)

to place an order for the respective device 10. Following replacement of the variable, host device 14 accessing the variable may depict an email address with an order button to couple the host device 14 with a predetermined email address (corresponding to the variable) to place an order for the respective device 10. Image forming device 10 indicates the identification and/or status of the imaging consumable to the appropriate host device 14 and the variable controls communication via device 10 or device 14 of the status to an appropriate entity (e.g., web site, e-mail address, etc.).

Next follows a description of an exemplary methodology according to aspects of the present invention for altering the configuration of image forming device 10 to utilize an alternative consumable order assist function. Further details regarding configuration of image forming device 10 are described in the U.S. patent application entitled "An Apparatus, an Article of Manufacture, and A Method of Reconfiguring an Image Forming Device", with Robert E. Haines and Mark A. Harper as inventors, filed the same day as this application, having Ser. No. 09/710367, and incorporated herein by reference.

A given host device 14 using an appropriate protocol, such as remote query language, may poll a given image forming device 10 to determine the initial or current setting of a given variable of host device 14. For example, within the SNMP protocol, a "get" command may be utilized to determine the setting of the variable for controlling the consumable order assist functionality.

The user of host devices 14 may thereafter, using the given protocol, update or change the variable setting within image forming device 10. The user may use a "set" command within the SNMP protocol to change the setting of the appropriate variable controlling the consumable order assist functionality. In the described configuration, the updated variable is applied to image forming device 10 from communication medium 16. Processing circuitry 22 updates or replaces the current variable stored within storage circuitry 20 with the new updated variable. Alternatively, circuitry in interface 28 replaces the variable. Changing of the variable within storage circuitry 20 causes processing circuitry 22 or a host device 14 coupled with device 10 to formulate another of a plurality of possible consumable order assist functions.

For example, in a given image forming system 11 (FIG. 2), a user of one of host devices 14 may be responsible for purchasing imaging consumables. In such an application, the initial or current variable within storage circuitry 20 is replaced with a variable configured to cause processing circuitry 22 to formulate another consumable order assist function. An exemplary replacement or alternative consumable order assist function is provided as an email massage which includes an identifier (e.g. e-mail address) of the host device 14 of the purchaser of the imaging consumable, an identifier of the communicating image forming device 10, and an identifier of the imaging consumable being monitored. The formulated consumable order assist function is applied to interface 28 using communication medium 30. Interface 28 communicates the consumable order assist function externally of image forming device 10 using the identifier of the host device 14 of the purchaser. Thereafter, host device 14 receiving the e-mail depicts the identifiers using respective display 15 and the purchaser subsequently places the order pursuant to ordering procedure.

Alternatively, and by way of further example, the updated or replacement variable applied to image forming device 10 and stored within storage circuitry 20 may be utilized to cause processing circuitry 22 to formulate another consumable order assist function comprising an identifier of the communicating image forming device 10 and a direct order for the imaging consumable being monitored. The order is automatically sent to a reseller of the imaging consumable as identified within the updated variable. For example, the variable specifies a URL address and causes processing circuitry 22 of image forming device 10 to directly send the order to the proper location corresponding to the URL address.

The described consumable order assist functions described herein are exemplary only and other functionality may be implemented within another consumable order assist function corresponding to a particular application of image forming device 10.

According to aspects of the present invention, the variable which controls consumable order assist functionality is stored within the respective image forming device 10. Thereafter, other host devices 14 poll the individual image forming device 10 to determine the current configuration of device 10. Thus, there is no need to perform an update to system 11 following reconfiguration of the proper variable or to implement sophisticated discovery mechanisms. Individual host devices 14 need not be made aware in advance of the current setting of a particular image forming device 10 but can access the variable provided within the respective image forming device 10 using for example, the remote query language protocol.

FIG. 4 depicts an exemplary methodology for updating or replacing a variable within image forming device 10 to implement a change in the consumable order assist function formulated responsive to a consumable being at a predetermined level. The depicted exemplary methodology of FIG. 4 is implemented as a series of ordered executable instructions stored within storage circuitry 20 which are presented to processing circuitry 22 for execution. In other alternative configurations, the depicted methodology is implemented in hardware.

At step S10, processing circuitry 22 executing the series of ordered instructions determines whether a proper request or query (e.g., SNMP request) is received within image forming device 10. If not, processing circuitry S10 returns to step S10 to await the reception of the appropriate query or perform other tasks (not shown). If a query is detected at step S10, the methodology proceeds to step S12.

At step S12, image forming device 10 exposes variables responsive to the query or request of step S10. Variables may be displayed using a user interface (not shown) within image forming device 10 or alternatively forwarded to the respective host device 14 for depiction using appropriate display 15.

At step S14, the methodology waits for a given period of time to determine whether a replacement command or other equivalent command has been received. One possible command is a "set" command in the SNMP protocol. If not, the methodology returns to step S10. Otherwise, the methodology proceeds to step S16.

The methodology instructs processing circuitry 22 at step S16 to replace the exposed variable stored within storage circuitry 20 with another variable provided within the command in one exemplary configuration. Following replacement of the variable with another variable, processing circuitry 22 accesses the subsequently stored variable to formulate future consumable order assist functions or for future display following receipt of a proper variable request, such as a "get" command.

The protection sought is not to be limited to the disclosed embodiments, which are given by way of example only, but instead is to be limited only by the scope of the appended claims.

What is claimed is:

1. An image forming device comprising:
   storage circuitry configured to store an initial variable configured to control the formulation of an initial one of a plurality of consumable order assist functions configured to assist replenishment of an imaging consumable;
   imaging circuitry configured to consume the imaging consumable to form hard images;
   a sensor configured to monitor a status of the imaging consumable and to output a signal indicative of the status;
   processing circuitry configured to replace the initial variable with another variable configured to control the formulation of another of the consumable order assist functions, to receive the signal from the sensor, and to formulate the another consumable order assist function responsive to reception of the signal and the another variable; and
   an interface configured to communicate the another consumable order assist function externally of the image forming device.

2. The image forming device according to claim 1 wherein the processing circuitry is configured to receive the another variable using a remote query language.

3. The image forming device according to claim 1 wherein the processing circuitry is configured to receive the another variable using a Simple Network Management Protocol.

4. The image forming device according to claim 1 wherein the imaging circuitry comprises printer circuitry configured to print hard images upon media.

5. The image forming device according to claim 1 wherein the processing circuitry is configured to formulate the initial consumable order assist function comprising the identifier of the supplier of the imaging consumable and an identifier of the imaging consumable being monitored.

6. The image forming device according to claim 1 wherein the processing circuitry is configured to formulate the another consumable order assist function comprising the identifier of the purchaser of the imaging consumable, an identifier of the image forming device, and an identifier of the imaging consumable being monitored.

7. The image forming device according to claim 1 the processing circuitry is configured to formulate the another consumable order assist function comprising an identifier of the imaging forming device and an order for the imaging consumable being monitored, and the processing circuitry is configured to forward the order to a predetermined location.

8. The image forming device according to claim 1 wherein the initial consumable order assist function comprises one of an identifier of a supplier of the imaging consumable and an identifier of a purchaser of the imaging consumable and the another consumable order assist function comprises an other of the identifier of the supplier of the imaging consumable and the identifier of the purchaser of the imaging consumable, and wherein the initial and the another consumable order assist functions are different.

9. An image forming system comprising:
   an image forming device configured to consume an imaging consumable to form hard images, to monitor a status of the imaging consumable, and to store an initial variable configured to control the formulation of an initial one of a plurality of consumable order assist functions configured to assist replenishment of the imaging consumable;
   a host device coupled with the image forming device and configured to provide another variable to the image forming device to control the formulation of another one of the consumable order assist functions, wherein the image forming device is configured to replace the initial variable with the another variable to control the formulation of the another consumable order assist function responsive to the detection of a predetermined status of the imaging consumable; and
   wherein the initial consumable order assist function comprises only one of an identifier of a supplier of the imaging consumable and an identifier of a purchaser of the imaging consumable and the another consumable order assist function comprises only an other of the identifier of the supplier of the imaging consumable and the identifier of the purchaser of the imaging consumable.

10. The image forming system according to claim 9 wherein the host device is configured to provide the another variable to the image forming device using a remote query language.

11. The image forming system according to claim 9 wherein the host device is configured to provide the another variable to the image forming device using a Simple Network Management Protocol.

12. The image forming system according to claim 9 wherein the image forming device is configured to print images upon media to form images.

13. The image forming system according to claim 9 wherein the image forming device is configured to formulate the another consumable order assist function.

14. The image forming system according to claim 9 wherein the image forming device is configured to formulate the initial consumable order assist function comprising the identifier of the supplier of the imaging consumable and an identifier of the imaging consumable being monitored, and the host device is configured to display the identifier of the imaging consumable and the identifier of the supplier of the imaging consumable.

15. The image forming system according to claim 9 wherein the image forming device is configured to formulate the another consumable order assist function comprising the identifier of the purchaser of the imaging consumable, an identifier of the image forming device, and an identifier of the imaging consumable being monitored, and the host device is configured to display the identifier of the imaging consumable and the purchaser of the imaging consumable.

16. The image forming system according to claim 9 wherein the image forming device is configured to formulate the another consumable order assist function comprising an identifier of the imaging forming device and an order for the imaging consumable being monitored, and the image forming device is configured to forward the order to a predetermined location.

17. A method of facilitating ordering of an imaging consumable useable within an image forming device comprising:
   providing an image forming device configured to use an imaging consumable to form hard images;
   providing an initial variable within the image forming device to control the formulation of an initial one of a plurality of consumable order assist functions configured to assist replenishment of the imaging consumable;

replacing the initial variable with another variable within the image forming device to control the formulation of another of the consumable order assist functions;

detecting an amount of the imaging consumable being at a predetermined status;

generating the another one of the consumable order assist functions responsive to the detecting and the replacing; and wherein the generating comprises generating the another consumable order assist function using the image forming device.

18. The method according to claim 17 further comprising providing the another variable within the image forming device using a remote query language.

19. The method according to claim 17 wherein the providing comprises providing an image forming device comprising printer circuitry configured to print images upon media to form hard images.

20. The method according to claim 17 wherein the providing the initial variable comprises providing the initial variable to cause the image forming device to formulate the initial consumable order assist function to comprise an identifier of a supplier of the imaging consumable and an identifier of the imaging consumable.

21. The method according to claim 17 wherein the generating comprises formulating the another consumable order assist function to comprise an identifier of a purchaser of the imaging consumable, an identifier of the image forming device, and an identifier of the imaging consumable.

22. The method according to claim 17 wherein the generating comprises formulating the another consumable order assist function to comprise an identifier of the imaging forming device and an order for the imaging consumable.

23. The method according to claim 17 wherein the initial consumable order assist function comprises one of an identifier of a supplier of the imaging consumable and an identifier of a purchaser of the imaging consumable and the another consumable order assist function comprises an other of the identifier of the supplier of the imaging consumable and the identifier of the purchaser of the imaging consumable, and wherein the initial and the another consumable order assist functions are different.

24. A method of facilitating ordering of an imaging consumable useable within an image forming device comprising:

providing an image forming device configured to use an imaging consumable to form hard images;

providing an initial variable within the image forming device to control the formulation of an initial one of a plurality of consumable order assist functions configured to assist replenishment of the imaging consumable;

replacing the initial variable with another variable within the image forming device to control the formulation of another of the consumable order assist functions;

detecting an amount of the imaging consumable being at a predetermined status;

generating the another one of the consumable order assist functions responsive to the detecting and the replacing; and wherein the initial consumable order assist function comprises one of an identifier of a supplier of the imaging consumable and an identifier of a purchaser of the imaging consumable and the another consumable order assist function comprises an other of the identifier of the supplier of the imaging consumable and the identifier of the purchaser of the imaging consumable, and wherein the initial and the another consumable order assist functions are different.

* * * * *